Feb. 16, 1971 C. E. RAUTIO 3,562,932
SNOW BLOWER ATTACHMENT FOR ROTARY LAWN MOWERS
Filed May 8, 1968
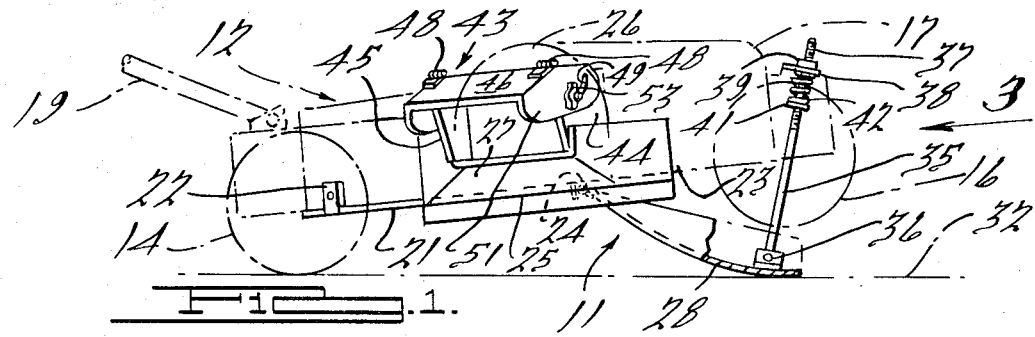
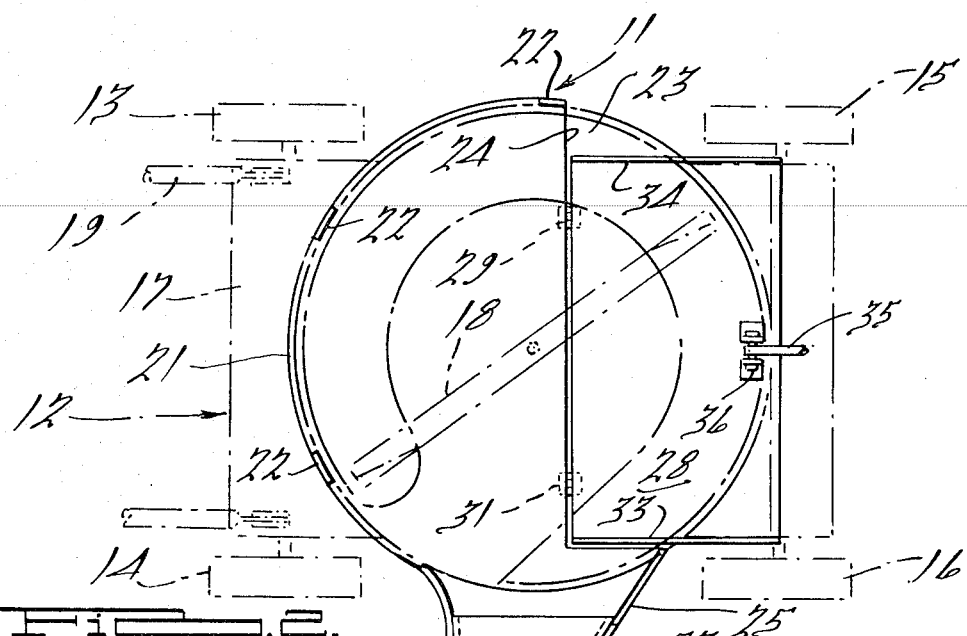
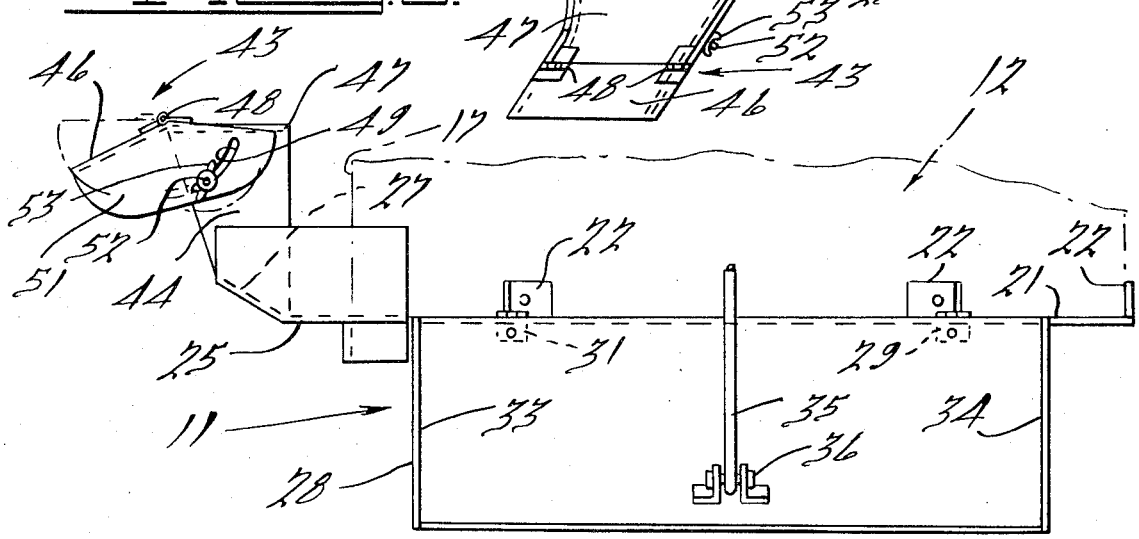
INVENTOR.
Charles E. Rautio
BY
Harness, Dickey & Pierce
ATTORNEYS.

United States Patent Office 3,562,932
Patented Feb. 16, 1971

3,562,932
SNOW BLOWER ATTACHMENT FOR ROTARY LAWN MOWERS
Charles E. Rautio, 14122 Rockland, Detroit, Mich. 48239
Filed May 8, 1968, Ser. No. 727,622
Int. Cl. E01h 5/09
U.S. Cl. 37—43
5 Claims

ABSTRACT OF THE DISCLOSURE

A snow blower attachment adapted to convert a conventional, rotary type lawn mower into a snow blower. The attachment effects this conversion without necessitating removal of the conventional grass cutting blade and is adapted to a wide variety of mowers.

BACKGROUND OF THE INVENTION

This invention relates to a snow blower attachment for a rotary lawn mower and more particularly to an improved attachment for converting a conventional, rotary type lawn mower into a snow blower without requiring any substantial modification of the mower.

Considerable interest has been experienced recently in snow blowers for home or commercial application. Such snow blowers normally serve only this function and hence, are an additional piece of equipment which must be stored by the owner during their season of non-use. Aside from this storage problem, snow blowers are relatively expensive units since they require an independent prime mover, snow removal and snow blowing components. It has heretofore been proposed to convert rotary type lawn mowers into snow blowers although such conversions have not enjoyed any substantial commercial success. Substantially all of the previously proposed conversions have necessitated considerable modification to the lawn mower so that it may serve the dual function. For the most part, the previously proposed conversions have required a separate snow removal blade. That is, the grass cutting blade of the mower must be removed to render the mower usable as a snow blower.

It is, therefore, a principal object of this invention to provide an improved, simplified attachment for converting a conventional, rotary lawn mower into a snow blower.

It is another object of this invention to provide a snow blower attachment for a rotary lawn mower that does not require a special snow removal blade.

SUMMARY OF THE INVENTION

A snow blower attachment embodying this invention is particularly adapted for use with a rotary lawn mower having a grass cutting blade surrounded in part by a housing defining a grass discharge chute. The attachment is comprised of an adapter shroud and a snow blade. The adapter shroud may be detachably affixed to the mower housing in underlying relation with respect to the grass cutting blade and without requiring replacement of this blade. The housing and attached shroud define a snow receiving opening in registry with the grass cutting blade for the introduction of snow to the grass cutting blade for subsequent discharge from the grass chute. The snow blade is carried by the adapter shroud contiguous to the snow receiving opening and extends downwardly toward the ground for deflecting snow into the snow receiving opening as the mower is moved along the ground.

BRIEF DESCRIPTION OF THE DRAWINGS

FIG. 1 is a side elevational view of a snow blower attachment affixed to a conventional, rotary type lawn mower, shown in phantom in the drawings.

FIG. 2 is a top plan view of the mechanism shown in FIG. 1.

FIG. 3 is an enlarged view taken in the direction of the arrow 3 in FIG. 1.

DETAILED DESCRIPTION OF THE PREFERRED EMBODIMENT

In the drawings, the reference numeral 11 indicates generally a snow blower attachment embodying this invention and particularly adapted for use with any of a wide variety of conventional, rotary type lawn mowers, a typical one of which is shown in phantom and is identified generally by the reference numeral 12. The rotary type lawn mower 12 is comprised of ground engaging wheels 13, 14, 15 and 16 that are journaled in any known manner at the respective corners of a housing assembly 17. A grass cutting blade 18 is journaled within the housing 17 also in a known manner. The blade 18 is driven by any suitable prime mover such as an electric motor or gasoline engine, which prime mover may also drive one or more of the ground engaging wheels 13 through 16. A handle 19 is carried at the rear end of the housing 17 so that an operator may manipulate the mower 12 and may provide the motive power for the mower in the event it is not self propelled.

The snow blower attachment 11 includes an adapter shroud 21 that has a generally semi-circular configuration and which is formed with integral upwardly extending tabs 22 at spaced locations for connection of the shroud 21 to the mower housing 17. It is to be understood that the size of the adapter shroud 21 may vary dependent upon the configuration of the housing of the associated mower, but a given design adapter shroud preferably provides for a universal attachment so that it may be used with a wide variety of types of mowers.

The adapter shroud 21 underlies in part the open bottom of the housing 17 beneath the cutting blade 18. A snow receiving opening 23 is, however, provided between the forward edge 24 of the adapter shroud 21 and the respective portion of the mower housing 17. In addition, the adapter shroud 21 is formed with an outwardly extending portion 25 that is adapted to underlie a grass discharge chute 26 defined by the mower housing 17 between the wheels 14 and 16. Preferably, the shroud portion 25 is upwardly inclined, as at 27, at its outer end so that the snow which is blown out of the chute 26 will be deflected slightly upwardly, as will become more apparent as this description proceeds.

A generally curved snow blade 28 is hinged, as at 29 and 31, to the shroud 21 adjacent its leading edge 24. The snow blade 28 curves downwardly toward the ground, indicated by a reference line 32, and may be formed with upstanding side walls 33 and 34. As the mower 12 and connected snow blower attachment 11 is pushed or driven along the ground, the snow blade 28 will deflect snow upwardly into the snow receiving opening 23 whereupon the grass cutting blade 18 will drive the snow outwardly and upwardly through the grass chute 26 and cooperating shroud portions 25 and 27. The sides 33 and 34 of the snow blade 28 will insure that all of the snow met by the blade 28 will be discharged.

The pivotal connection of the snow blade 28 to the shroud 21 permits adjustment of the angular position of the mower 12 with respect to the ground line 32. This adjustment has been found particularly useful in adapting the attachment to varying snow conditions and varying types of mowers. The angular position of the blade 28 with respect to the shroud 21 may be adjusted by an adjustment rod 35 that is pivoted at its lower end to the blade 28, as by means of a pivot pin 36. The upper end of the rod 35 is threaded, as at 37, and passes through an aperture in the bracket 38 which may be conveniently attached to the mower housing 17 or may, in fact, extend through an aperture formed in the housing 17 dependent upon the mower design. Adjustment nuts 39 and 41 are disposed on opposite sides of the bracket 38 with a spring 42 being disposed around the rod end 37 between the nut 41 and bracket 38. It should be readily clear that the axial position of the nuts 39 and 41 upon the threaded end 37 of the rod 35 will determine the angular position of the blade 28 with respect to the shroud 21 as well as the angular position of the mower 12 with respect to the ground level 32.

It has been found that the aforedescribed attachment is highly effective in removing of greatly varying depths and moisture content. This snow removal is effected without resorting to any special snow removal blade and without necessitating replacement of the grass cutting blade 18 by such a special blade. In some instances, it may be desirable to limit the distance which the snow is thrown by the mower 12 and cooperating snow blower attachment 11. The deflector shroud, indicated generally by the reference numeral 43, is provided for this purpose. The deflector shroud 43 is comprised of a pair of upstanding arms 44 and 45 which are fixed to the shroud portion 27 or, alternatively, which may be formed integrally with this shroud portion. A deflector element 46 is hinged to a cross plate 47 that extends between the legs 44 and 45, as by hinges 48. The deflector element 46 is formed with an arcuate slot 49 in each of its depending sides 51 through which a bolt or stud 52 passes. The bolt or stud 52 is fixed relative to the respective legs 44 and 45 and carries a wing nut 53 at its outer end so that the angular position of the deflector plate 46 may be adjusted.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A snow blower attachment for a rotary lawn mower having a grass cutting blade surrounded in part by a housing defining a grass discharge chute, said attachment comprising an adapter shroud adapted to be detachably affixed to the mower housing and underlying in part the grass cutting blade without replacement of the grass cutting blade, said shroud and the housing defining a snow receiving opening in registry with the grass cutting blade for the introduction of snow to the grass cutting blade for discharge from the grass chute, a snow blade carried by said adapter shroud contiguous to said snow receiving opening, said snow blade extending downwardly from said adapter shroud toward the ground for deflecting snow upwardly from the ground into said snow receiving opening as the mower moves along the ground and means for adjusting the angular position of said snow blade relative to said adapter shroud and concurrently adjusting the angular disposition of the mower with respect to the ground.

2. A snow blower attachment as set forth in claim 1 wherein the adjusting means comprises means for pivotally supporting the snow blade relative to the adapter shroud, an adjustment bar pivotally connected at one end to said snow blade and means for adjustably connecting the other end of said bar to the mower housing.

3. A snow blower attachment as set forth in claim 1 further including snow deflecting means adapted to overlie the grass discharge chute for deflecting the snow driven through the grass discharge chute by the grass cutting blade.

4. A snow blower attachment for a rotary lawn mower having a grass cutting blade surrounded in part by a housing defining an open bottom and a grass discharge chute at one side thereof, said attachment comprising a generally semi-cylindrical adapter shroud adapted to be detachably affixed to the open bottom of the mower housing beneath the grass cutting blade without replacement of the grass cutting blade, said adapter shroud further having a portion underlying the grass discharge chute, said adapter shroud and the open bottom of the housing defining a snow receiving opening in registry with the grass cutting blade for the introduction of snow to the grass cutting blade for discharge from the grass discharge chute, a generally curved snow blade, means for pivotally connecting one end of said snow blade to said adapter shroud adjacent the forward edge of said adapter shroud, an adjustment rod pivotally connected at one of its ends to the other end of said snow blade, and means for adjustably affixing the other end of said adjustment rod to the mower housing for adjusting the angular position of said snow blade with respect to said adapter shroud and the angular position of the mower housing with respect to the ground, said snow blade being adapted to deflect snow upwardly from the ground into said snow receiving opening as the mower moves along the ground.

5. A snow blower attachment as set forth in claim 4 further including a snow discharge deflector pivotally supported by the adapter shroud and adapted to be disposed adjacent the grass discharge chute for deflecting the snow driven from the grass discharge chute.

References Cited
UNITED STATES PATENTS

| | | | |
|---|---|---|---|
| 2,977,694 | 4/1961 | Higby | 37—43L |
| 3,035,359 | 5/1962 | Ewert | 37—43L |
| 3,043,036 | 7/1962 | Trojanek | 37—43X |
| 3,103,077 | 9/1963 | Bennett | 37—43L |
| 2,142,913 | 8/1964 | Jacob | 37—43L |
| 3,286,376 | 11/1966 | Wildes | 37—433L |
| 3,316,696 | 5/1967 | Florido | 37—43L |

ROBERT E. PULFREY, Primary Examiner

E. H. EICKHOLT, Assistant Examiner

U.S. Cl. X.R.

37—53; 56—25.4